United States Patent [19]

Lowry

[11] 3,916,313

[45] Oct. 28, 1975

[54] PSK-FSK SPREAD SPECTRUM MODULATION/DEMODULATION

[75] Inventor: Ray B. Lowry, San Diego, Calif.

[73] Assignee: The United States of America as represented by the Secretary of the Navy, Washington, D.C.

[22] Filed: Nov. 25, 1974

[21] Appl. No.: 527,111

[52] U.S. Cl. ........................ 325/30; 178/67; 325/65

[51] Int. Cl.$^2$ ............................................ H04B 1/62

[58] Field of Search ......... 325/30, 38 R, 39, 42, 43, 325/44, 65, 163; 343/7.6, 17.2 R, 17.5; 178/67

[56] References Cited

UNITED STATES PATENTS 3,478,268 11/1969 Coviello ............................... 325/65

3,689,841 9/1972 Bello et al............................ 325/39

*Primary Examiner*—Benedict V. Safourek

*Attorney, Agent, or Firm*—R. S. Sciascia; G. J. Rubens; H. Fendelman

[57] ABSTRACT

A spread spectrum link in which a transmitter section generates a different frequency signal for each unique data symbol accepted from the data source and phase shift modulates the frequency signals with a sequence of spread spectrum symbols, the frequency differences used being such that orthogonality is obtained over the receivers observation time of each spread spectrum symbol.

9 Claims, 9 Drawing Figures

PSK-FSK SPREAD SPECTRUM MODULATION/DEMODULATION

BACKGROUND OF THE INVENTION

Prior art methods of providing spread spectrum links required precision time and frequency references at both the transmitter and receiver and/or complex and expensive synchronization equipment at the receiver to establish and maintain carrier phase and/or frequency and spread spectrum sequence synchronization. Additionally, when carrier phase or frequency or spread spectrum sequence synchronization is required, the received signal must be present for some length of time before actual use of the link is began in order to establish the required synchronization. Among the prior art spread spectrum methods is the use of PN (Pseudo-Noise) or PR (Pseudo-Random) sequences to direct phase shift key (PSK) a carrier. This method is sometimes called PSK direct sequence modulation. The communication, identification, or navigation data from the data source is always at a much slower rate than the PN or PR rate and is used to control the phase of the PSK direct sequence modulation.

In one particular PSK direct sequence method, a shift register generator is used to produce a spread spectrum (SS) sequence of logic ones and zeros at rate $R_{SS}$ bits per second. This SS sequence is commonly a PN sequence. The data at rate $R_d$ bits per second is modulo-two added to the PN sequence such that the data bit reverses a short sequence of PN bits if it is a logic one but does not alter the same short sequence if it is a logic zero. The rate $R_d$ is always much less than the rate $R_{SS}$ and is equal to $1/T_d$, where $T_d$ is the data bit period. The output of the modulo-two adder at rate $R_{SS}$ is used to bi-phase modulate or quadraphase modulate a carrier. When used to bi-phase modulate a carrier, the modulated phase is either 0° or 180° and changes at rate $R_{SS}$. When used to quadraphase modulate a carrier, the modulated phase is either 0°, 90°, 180°, or 270° and changes at rate $R_{SS}/2$ . That part of the modulation due to the data is, however, bi-phase in both cases since the data bit causes a phase reversal, i.e., e., 180° change of the modulated signal for a time corresponding to the data bit period, $T_d$, if the data bit is a logic one, but does not alter the phase of the modulated signals if the data bit is a logic zero. Since $T_d$ is equal to $1/R_d$, it is always much larger than the PN bit period, $T_{SS}$, which is equal to $1/R_{SS}$ .

The receiver in this PSK direct sequence method may use either matched-filter or correlation detection. The matched-filter detection does not require phase synchronization or PR sequence synchronization but does require that the frequency error be small and that the outputs of the matched filters be sampled at a very precise time. The frequency error is the difference between the frequency of the received signal and the receiver's frequency. The receiver's frequency may either be preset in which case it is independent of the frequency of the received signal or it may be influenced by the frequency of the received signal via frequency tracking circuits. The frequency error may be due to differences between transmitter and receiver frequency synthesizers or oscillators and/or changes in the frequency as the signal propagates between the transmitting antenna and the receiving antenna and/or error in the receiver's frequency tracking circuits. The approximate degradation due to frequency error is illustrated in FIG. 1 and is seen to be a function of the data decision or observation time, $T_d'$, which is equal to or less than the data bit period, $T_d$. A decision or observation time is that time during which the receiver is using the received signal in some way to affect its output. If the frequency error without a frequency tracking circuit in the receiver is too large, then a frequency tracking circuit must be added. The received signal must be present for some length of time before actual use of the link is begun in order to establish the frequency tracking. This time may be longer than or at least a significant fraction of the actual use time in many cases and it is highly undesirable in some applications including but not limited to time-shared multiple user systems, burst systems, and systems which desire to minimize the transmitted energy.

The correlation detection requires both phase synchronization and PN sequence synchronization in addition to the requirement for small frequency error. The phase and PN sequence synchronizations are usually provided by complex and costly interacting circuits commonly called carrier tracking and clock tracking loops respectively. The frequency error is automatically made small when phase synchronization is required. The phase and/or PH sequence synchronizations are infrequently provided by precision time and frequency references. The wide scale establishment of precision time and frequency references is also costly and is not presently available. The received signal must also be present for some length of time before actual use of the link is begun in order to establish the phase and the PH sequence synchronizations required for correlation detection. This time may be longer than or at least a significant fraction of the actual use time in many cases and is highly undesirable in some applications including but not limited to time-shared multiple user systems, burst systems, and systems which desire to minimize the transmitted energy.

One variation of the above described PSK direct sequence method superficially appears to be similar to the PSK-FSK spread spectrum modulation/demodulation apparatus and method of the present invention. This variation uses the communication, identification, or navigation data from the data source to select one of two available frequencies instead of using phase reversal for binary data modulation. The difference between these two frequencies is $1/T_d'$, where $T_d'$ is the data decision time. Degradation due to frequency error is illustrated in FIG. 1.

The disadvantages of the prior art spread spectrum methods are (a) frequency tracking is required if the frequency error is more than about $0.1/T_d'$, (b) in some applications the time required for establishing phase synchronization, SS sequence synchronization, and/or frequency tracking is highly undesirable, and (c) in some cases complex and expensive circuits are required.

SUMMARY OF THE INVENTION

The present invention provides a novel spread spectrum modulation/demodulation technique and apparatus which is simple and inexpensive since it does not require the carrier phase synchronization and/or the precise carrier frequency synchronization at the receiver that is required at the receivers of other spread spectrum links. According to the present invention, each unique data symbol is used to select a different carrier frequency. A spread spectrum sequence is used to phase shift modulate the selected frequency. The present invention has the very important distinction from the above described prior art methods in that it uses frequency differences such that orthogonality is obtained over $I_{ss}'$, the receivers observation time of each spread spectrum symbol. The applications of the spread spectrum link of the present invention include but are not limited to anti-jam, low probability of intercept, multipath resistance links for communication, identification, navigation, ranging, and direction finding.

STATEMENT OF THE OBJECTS OF THE INVENTION

It is the primary object of the present invention to disclose a novel spread spectrum link.

It is another object of the present invention to provide a spread spectrum link not requiring phase synchronization and/or frequency synchronization.

It is a further object of the present invention to provide a novel modulation/demodulation technique and apparatus.

Other objects, advantages and novel features of the invention will become apparent from the following detail description of the invention when considered in conjunction with the accompanying drawings.

DESCRIPTION OF THE PREFERRED EMBODIMENTS

Figure 2:
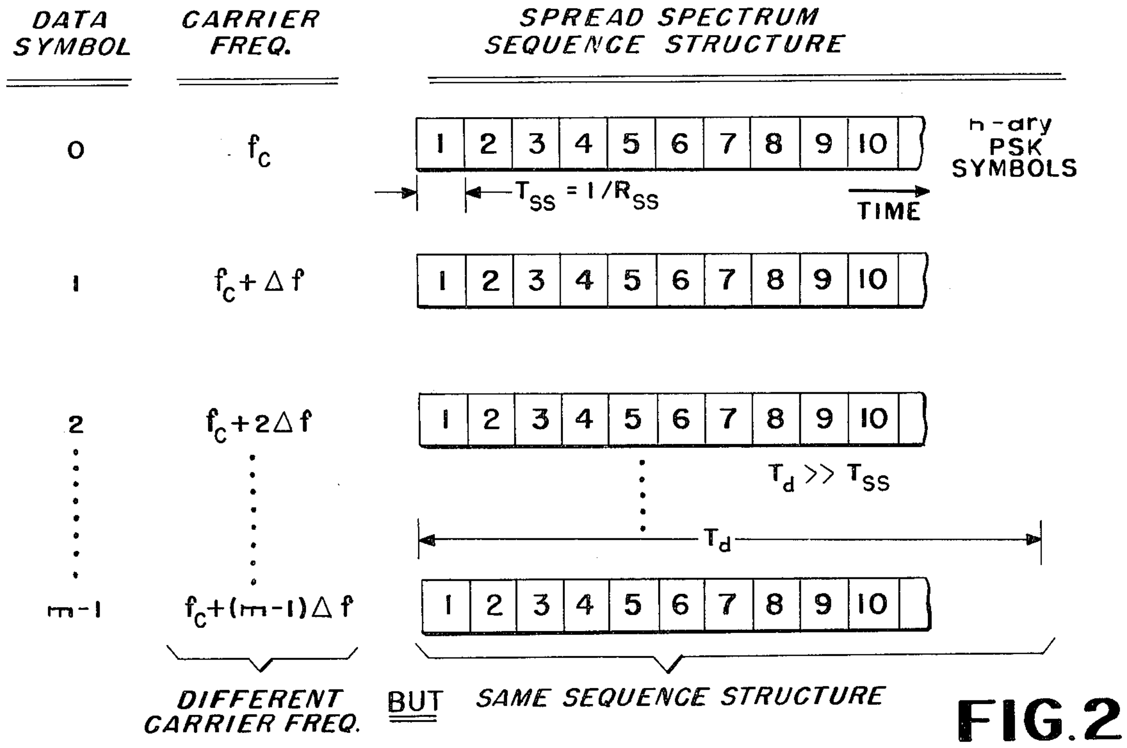
FIG. 2 is an illustration of the set of possible transmit signals according to the present invention.

A spread spectrum (SS) sequence at $R_{SS}$ symbols per second is transmitted using $n$-ary phase shift keying (PSK) on one of m orthogonal carriers for $m$-ary data as illustrated in FIG. 2. Each unique data symbol will, according to the present invention, cause the selection of a different carrier frequency. The SS sequence is preferably a pseudo-noise (PN) or secret sequence but may be any sequence, including an assembly of subsequences which may be interrelated in some manner. The n phases for the SS sequence may be, but are not limited to, 2-ary (bi-phase) for binary SS symbols and 4-ary (quadriphase, quadraphase, or dual binary) for quaternary SS symbols. The m carriers for the data may be, but are not limited to, 2-ary for binary data and 4-ary for quaternary data. The SS symbol period, $T_{SS}$ is equal to $1/R_{ss}$. The frequency spacings, $\Delta f$ Hertz, between adjacent carriers are all equal and are such that $1/\Delta f$ equals the SS observation time, $T_{SS}'$, which is equal to or less than $T_{SS}$. The correlation between the members of the possible transmitted signals, m in number, is therefore zero over the $T_{SS}'$ observation time if there is no frequency error between the received frequency and the receiver's frequency. When the correlation is zero, the set of possible transmitted signals are said to be orthogonal, that is;

$$\int_0^{T_{SS}} S(2\pi f_i t)\, S(2\pi f_j t+\phi)\, dt \begin{cases} = 0 \text{ if } i \neq j \\ = 1 \text{ if } i = j \text{ and } \phi = 0 \end{cases}$$

where $S(2\pi f_i t)$ is any member of the set of possible transmitted signals and $\phi$ is an arbitrary phase.

Figure 1:
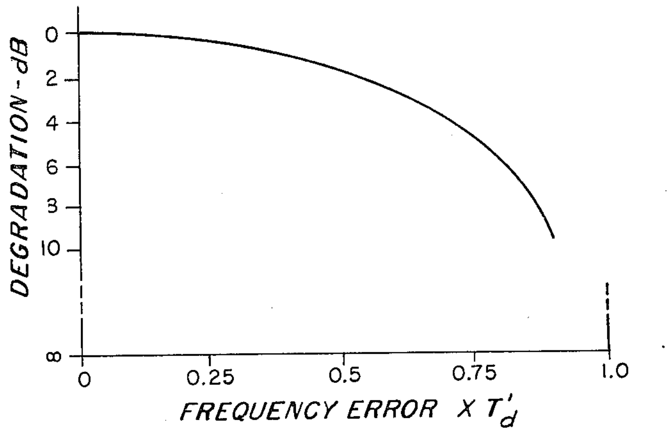
FIG. 1 is a graph of the degradation due to frequency error in a prior art device.
Figure 5:
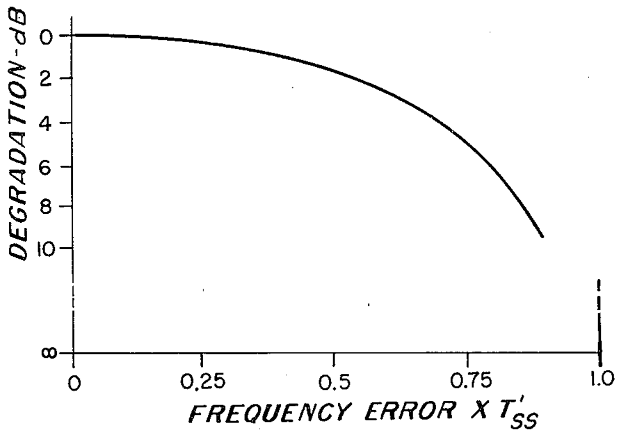
FIG. 5 is a graph of the degradation due to frequency error of the present invention.

When there is a frequency error between the received frequency and the receivers frequency, the correlation in the receiver between the members of the set of possible transmitted signals is no longer zero and the performance of the receiver is degradated with respect to the zero frequency error case. This degradation is illustrated in the graph of FIG. 5 and is seen to be a function of $T_{SS}'$. As is evident from a comparison between the degradation curve for prior art techniques illustrated in FIG. 1 and the degradation curve for the present invention illustrated in FIG. 5, the frequency error according to the technique of the present invention has to be much larger to result in the same degradation as the prior art techniques since the bit time $T_d'$ is much larger than the time $T_{SS}'$.

Figure 3:
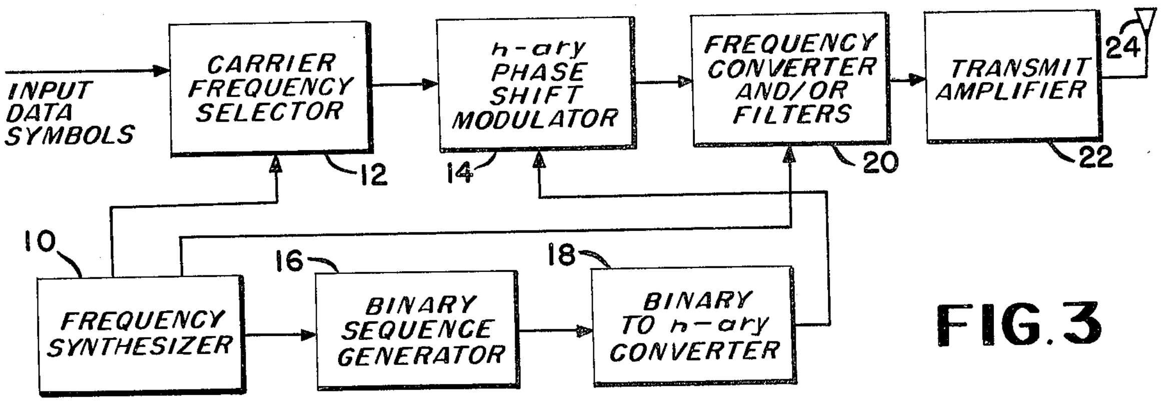
FIG. 3 is a network block diagram of one embodiment of the transmitter of the present invention.

A block diagram of one embodiment of the transmitter according to the present invention is illustrated in FIG. 3. Frequency synthesizer 10 provides all the frequency and timing signals utilized. The $m$-ary data symbols at a rate of $R_d$ symbols per second from the data source (not shown) are used to select one of m frequencies by the carrier frequency selector 12 for a period of $T_d$ seconds. The selected frequency is used as the carrier for the $n$-ary phase shift modulator 14. The $m$ frequencies furnished by synthesizer 10 are $f_1 + k\Delta f$, where $0 \leq k \leq (m\text{-}1)$. Binary sequence generator 16 is used to generate a binary SS sequence. Binary sequence generator 16 receives a timing pulse from synthesizer 10, each PN bit time, i.e., every $T_{SS}$, and also receives a timing pulse at the occurrence of each data bit. Binary to $n$-ary converter 18 is used to convert the binary sequence into an $n$-ary sequence at the rate of $R_{SS}$ SS symbols per second. Converter 18 would not be required, of course, if $n = 2$. The output of converter 18 is used as the modulating signal into the $n$-ary phase shift modulator 14. The $n$-ary phase shift modulator 14 produces an $n$-ary phase shift modulated signal at the frequency selected by the carrier frequency selector 12. The frequency of the modulated signal is one of the m frequencies $f_1 + k\Delta f$ where $1/\Delta f$ equals the SS observation time, $T_{SS}'$, which is $\leq T_{SS}$. The phase of the modulated signal from modulator 14 is one of $n$ phases corresponding to the $n$-ary SS modulating signal. If necessary, the modulated signal is converted to a suitable carrier frequency $f_c + k\Delta f$ by up converter 20 which may also include suitable filters. In the case where $f_c = f_1$, the up converter of unit 20 may consist solely of suitable filters for filtering out unwanted side bands. The filtering provided by unit 20 is not required in all applications and when it is required its characteristics may vary widely in accordance with the requirements for a particular application. The output of the frequency converter and/or filters 20 is amplified by transmit amplifier 22 to the required transmitter power level and is transmitted by antenna 24. If the antenna is also used by other transmitters and/or receivers, a multicoupler/-filter may be utilized between the transmit amplifier and the antenna. Additionally, the transmit amplifier may be shared with other systems via methods such as time division multiplexing or frequency division multiplexing.

Figure 3A:
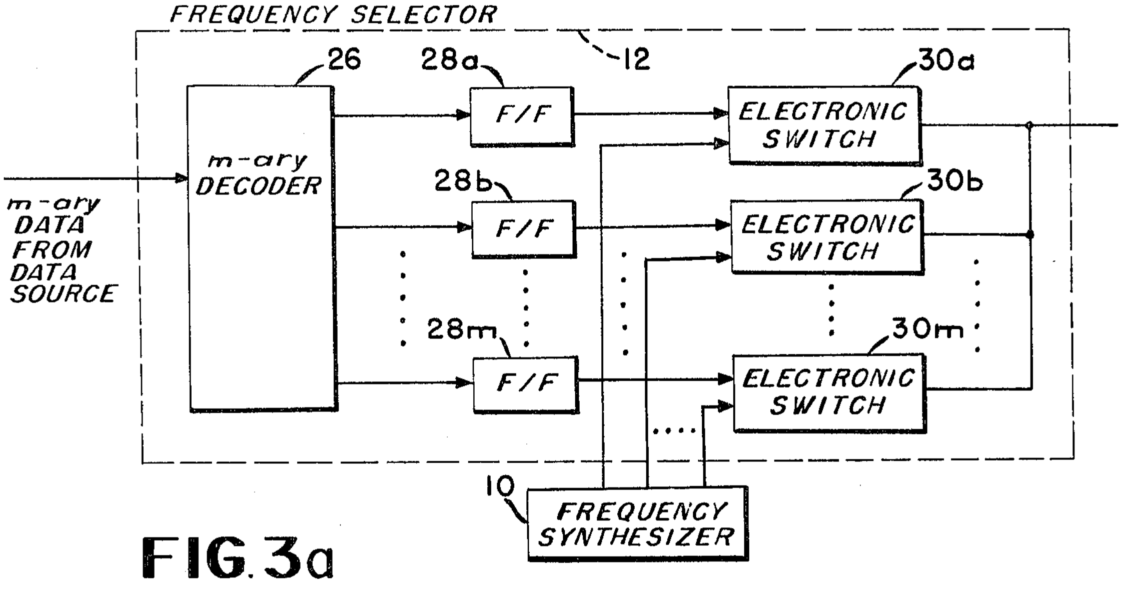
FIG. 3A is a network diagram of the frequency selector of FIG. 3.
Figure 3B:
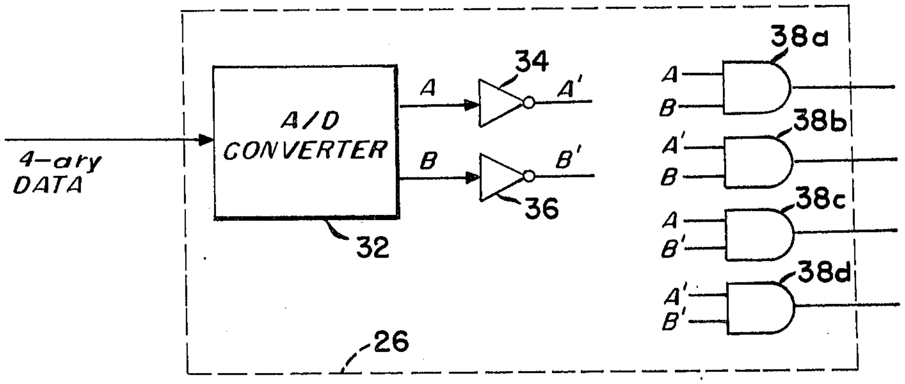
FIG. 3B is a network diagram of the decoder of FIG. 3A.

One possible implementation of the carrier frequency selector of FIG. 3 is illustrated in FIG. 3A. *M*-ary decoder 26 decides which of the *m*-ary signals has arrived and outputs a pulse on one of m selector lines which are the inputs to the flip-flops 28*a*, 28*b*, . . . 28*m*. Upon receiving an input, the activated flip-flop energizes one of the electronic switches 30*a*, 30*b*, . . . 30*m* which outputs the one frequency signal from synthesizer 10 connected to its input.

Where binary data is being transmitted, *m*-ary decoder 26 may comprise a flip-flop. For 4-ary amplitude data, decoder 26 may be implemented as illustrated in FIG. 3B wherein it is seen that the 4-ary amplitude data is furnished as an input to the A/D converter 32 which is provided with two outputs A and B. Each of the outputs A and B are inverted by inverters 34 and 36 respectively to provide the outputs A′ and B′. For each unique data symbol received a unique combination of the outputs A, B, A′, and B′ will be energized. Each possible combination of outputs is connected to the inputs of the AND gates 38*a*, 38*b*, 38*c*, and 38*d*. The connections have not been illustrated for the purpose of simplicity. Thus, if a 4-ary 1 is received AND gate 38*a* would be energized, if a 4-ary 2 is received AND gate 38*b* would be energized, etc., to activate the corresponding electronic switch 30.

Figure 4:
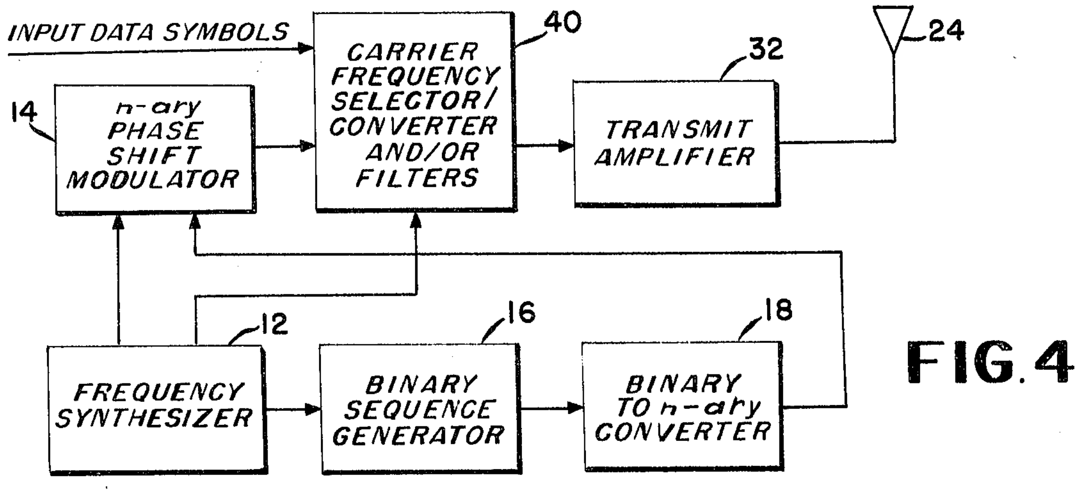
FIG. 4 is a network block diagram of a second embodiment of the transmitter of the present invention.

A block diagram of a second transmitter implementation is illustrated in FIG. 4. The apparatus illustrated in FIG. 4 produces an output from the transmit amplifier 22 which is identical to the output from the transmit amplifier in FIG. 3. The device of FIG. 4 is similar to that of FIG. 3, but it combines the carrier frequency selector with the frequency converter and/or filters in unit 40. The phase shift keyed output of the *n*-ary phase shift modulator 14 is always at frequency $f_2$ and is changed to one of m frequencies, $f_c + k\Delta f$ by unit 40.

Obviously any arrangement of elements could be utilized in the transmitter section as long as there is (1) some means for selection in response to acceptance of each unique data bit of one of m frequencies where the frequency differences $\Delta f$ between adjacent frequencies are all equal and are synthesized such that $$\frac{1}{\Delta f} = T_{SS},$$

which is $\leq T_{SS}$, the spread spectrum symbol period and (2) modulation of the selected frequency with a spread spectrum sequence.

Figure 6:
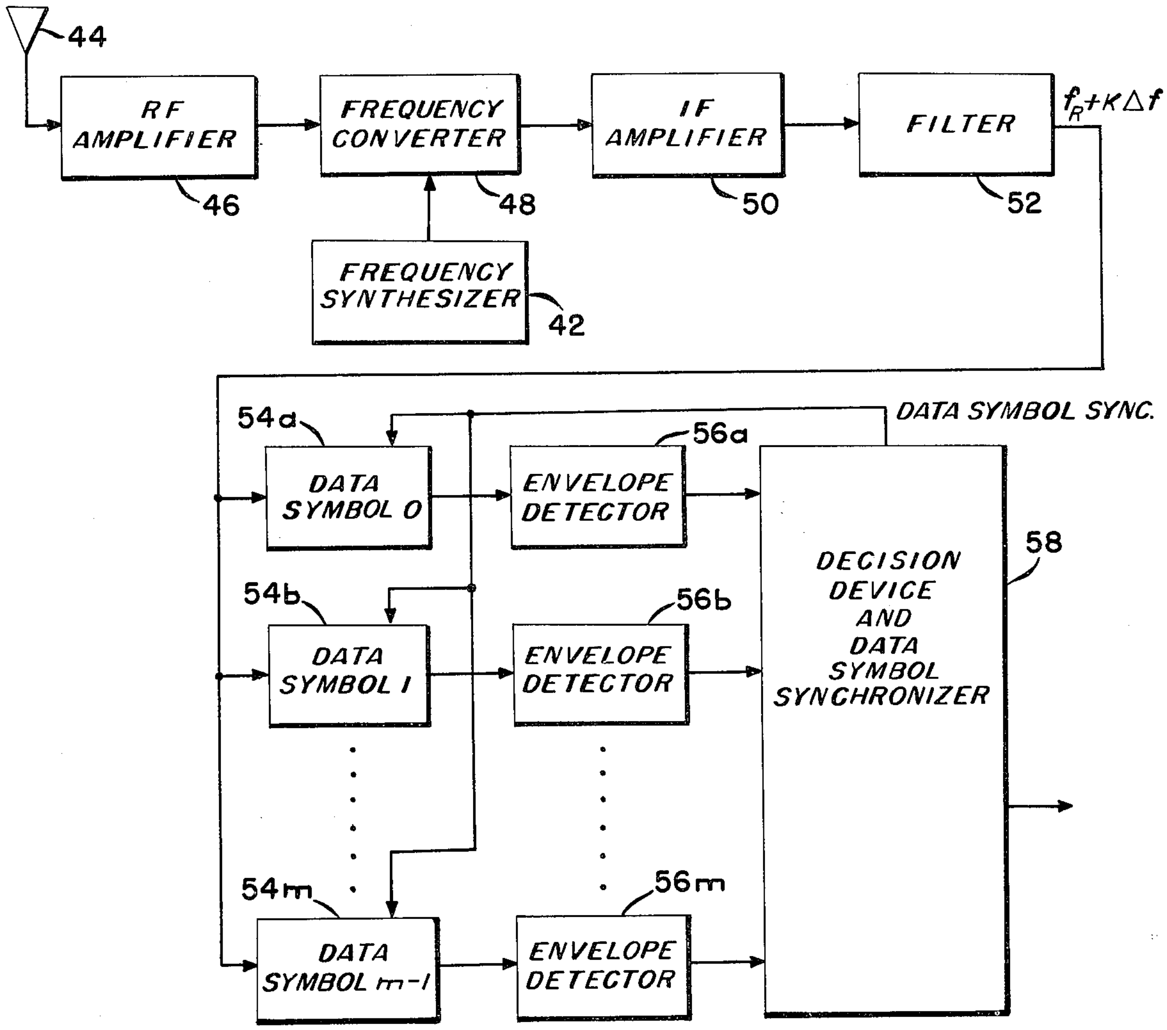
FIG. 6 is a network diagram of a matched filter type receiver according to the present invention.

A block diagram of a matched filter type receiver is shown in FIG. 6. The term matched filter type is used instead of matched filter because the receiver's overall response is not necessarily matched to the transmitted signal set. The receiver receives and demodulates the signals produced by any of the previously described transmitter methods. The frequency synthesizer 42 produces all of the frequency and timing signals which are independent of the received signal. The phase modulated signals each on one of m frequencies, $f_c + k\Delta f$, are received at the antenna 44 and amplified by the RF amplifier 46. The signal is then converted to a lower frequency, $f_R + k\Delta f$, by the frequency converter 48 and then further amplified by the IF amplifier 50. The signal is then filtered by network 52. This filtering may be, but is not limited to, non-linear, linear, band rejection, or bandpass. The filtered output of the IF amplifier 50 is used as the inputs to m matched or semi-matched filters 54*a*, 54*b*, . . . 54*m*, all of which are matched or semi-matched to the same *n*-ary PSK sequence. However, the frequency of each matched filter is matched to only one of m frequencies, $f_R + k\Delta f$. The output of each matched filter is envelope detected by one of the m envelope detectors 56*a*, 56*b*, . . . 56 *m*. The outputs of the envelope detectors are used as the inputs to the decision device and data symbol synchronizer 58 which samples the envelope detector outputs at the end of each data symbol, i.e., each $T_d'$ seconds, and decides the most likely transmitted symbol. This decision is in synchronization with the received data symbols and is in accordance with previously established criteria. These criteria, as well as the filter 52 and the departure from the use of match filters at items 54 vary widely with the application, the propagation characteristics, and the characteristics of the noise at the receiving antenna. The matched filter type receiver for the PSK-FSK spread spectrum signals does not require carrier synchronization or SS sequence synchronization. It can also tolerate a frequency error of a fraction of $1/T_{SS}'$ without significant degradation in performance as illustrated in FIG. 5 and if the frequency error is not larger than some specified fraction of $1/T_{SS}$ it does not require a frequency tracking circuit.

Figure 7:
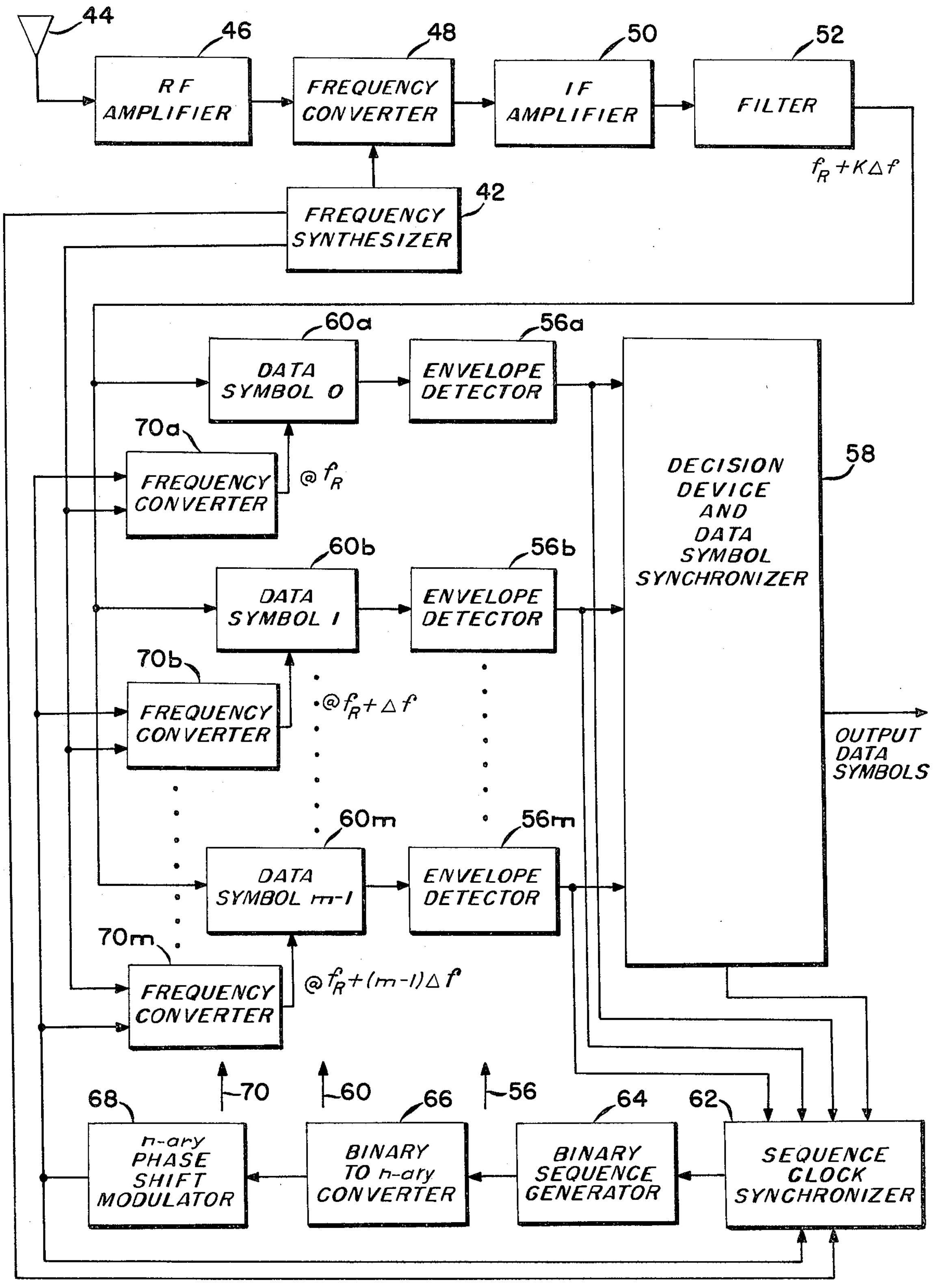
FIG. 7 is a network diagram of a correlation type receiver according to the present invention.

A correlation type receiver for PSK-FSK spread spectrum signals is illustrated in FIG. 7. The term correlation type receiver rather than simply correlation receiver has been used since the correlation signals produced by the receiver may not be identical to the signals in the transmitted signal set and/or the filtering prior to the correlation process may in some way alter the received signal. The frequency synthesizer 42, antenna 44, RF amplifier 46, frequency converter 48, IF amplifier 50, filter 52, envelope detectors 56*a*,... 56*m*, and decision device and data symbol synchronizer 58 all perform the same function as the corresponding elements in FIG. 6. Correlators 60*a*, 60*b*, . . . 60*m*, sequence clock synchronizer 62, binary sequence generator 64, binary to *n*-ary converter 66, *n*-ary phase shift modulator 68, and frequency converters 70*a*, 70*b*, . . . , 70*m* together perform the same function as the m matched filters 54*a*, 54*b*, . . . , 54*m* illustrated in FIG. 6. The binary sequence generator 64, the binary to *n*-ary converter 66, and the *n*-ary phase shift modulator 68, are identical to the corresponding units in FIG. 4. The output of the *n*-ary phase shift modulator is at frequency $F_3$ and has one of *n* phases each $T_{SS}$ seconds. Each of the *m* frequency converters 70 converts the output of the *n*-ary phase shift modulator to one of the frequencies $F_n + k\Delta f$, where $0 \leq k \leq (m\text{-}1)$. Each of the *m* correlators 60 correlates the output of the filter 52 with the output of one of the frequency converters 70. The correlators may be implemented in several ways, one of which is a multiplier followed by a bandpass integrator. The outputs of the correlators will be identical to the outputs of the matched filter in the match filter type receiver illustrated in FIG. 6 if the outputs of the binary to $n$-ary converter 18 illustrated in FIG. 4 is in synchronization with the received SS modulation, i.e., if the receiver is in sequence clock synchronization. The sequence clock synchronization is provided by the sequence clock synchronizer 62. Methods of implementing the sequence clock synchronizer include but are not limited to delay clock loops, tau jitter loops and decision lock loops.

Thus, a novel spread spectrum link has been disclosed which requires frequency tracking circuits only when the frequency error is more than about $0.1/T_{SS}'$, where $T_{SS}'$ is the receivers observation time of each spread spectrum symbol. Since $T_{SS}'$ is much less than $T_d'$, then $0.1/T_{SS}'$ is much larger than $1./T_d'$. The present invention is, therefore, much less sensitive to frequency error and only requires a frequency and/or phase tracking circuit in a few cases. Additionally, and more importantly, in all but a few cases it does not require the received signal to be present for a long length of time before actual use of the link is begun.

It is to be understood that the data symbols may occur in bursts instead of continually. The PSK-FSK spread spectrum signals would then occur in synchronization with these bursts. Such a system is called a pulsed system if only a single data source is used. However, if more than one data source is used the system is called a time-division-multiple-access system. The transmitter and receiver of the present invention may also be implemented in such a manner as to provide for other multiple access approaches including but not limited to frequency-division-multiple-access and code-division-multiple-access.

Obviously, many modifications and variations of the present invention are possible in the light of the above teachings. It is therefore to be understood that within the scope of the appended claims the invention may be practiced otherwise than as specifically described.

What is claimed is:

1. A communications system comprising:

a frequency synthesizer for outputting m different frequency signals having frequency spacings $\Delta f$ between adjacent frequency signals;

selector means for receiving $m$-ary data symbols and for selecting a different one of said m frequency signals for each unique data symbol of said $m$-ary data symbols that is received;

spread spectrum means for generating an $n$-ary sequence of symbols, the symbol period being $T_{SS}$, and for modulating the selected frequency signals to produce $n$-ary phase shift modulated signals where the frequency spacings $\Delta f$ between adjacent $n$-ary phase shift modulated signals are equal, and $$\frac{1}{\Delta f} \leq T_{SS};$$

means for transmitting said $n$-ary phase shift modulated signals at carrier frequencies;

receiver means for receiving said $n$-ary phase shift modulated signals and for demodulating said $n$-ary phase shift modulated signals.

2. The system of claim 1 wherein said spread spectrum means comprises:

a binary sequence generator connected to said frequency synthesizer;

a binary to $n$-ary converter connected to said binary sequence generator;

an $n$-ary phase shift modulator connected to said binary to $n$-ary converter.

3. The system of claim 1 wherein said means for transmitting signals at carrier frequencies comprises:

an up-converter connected to said $n$-ary phase shift modulator; and a transmitter amplifier connected to said up-converter.

4. The system of claim 1 wherein said receiver means comprises:

first means for converting said carrier frequency signals to receiver frequency signals having frequencies $f_r + k\Delta f$ where $0 \leq k \leq (m\text{-}1)$; and second means connected to said first means for determining which data symbols were transmitted.

5. The system of claim 4 wherein said second means comprises:

a plurality of filters connected to said first means;

a plurality of envelope detectors connected to said plurality of filters and;

decision means connected to said plurality of envelope detectors.

6. The system of claim 4 wherein said second means comprises:

a plurality of correlators connected to said first means;

a plurality of envelope detectors connected to said plurality of correlators; and decision means connected to said plurality of correlators.

7. A method of spread spectrum communication comprising the steps of:

a. generating an $n$-ary sequence of signals, the signal period being $T_{SS}$;

b. generating $m$ different frequency signals having equal frequency spacings $\Delta f$ between adjacent frequency signals where $$\frac{1}{\Delta f} \leq T_{SS},$$

c. accepting $m$-ary data symbols from a data source;

d. selecting a different one of said $m$ frequency signals for each unique data symbol accepted;

e. phase shift modulating the selected signal with said $n$-ary sequence;

f. transmitting signals at carrier frequencies corresponding to the phase shift modulated signals.

8. The method of spread spectrum communication of claim 7 further comprising the steps of:

receiving said signals at carrier frequencies; and demodulating said signals at carrier frequencies to obtain the original data symbols.

9. A spread spectrum modulator comprising:

a frequency synthesizer for outputting $m$ different frequency signals having frequency spacings $\Delta f$ between adjacent frequency signals;

selector means for accepting $m$-ary data symbols and for selecting a different one of said $m$ frequency signals for each unique data symbol of said $m$-ary data symbols that is accepted;

spread spectrum means for generating an $n$-ary sequence of symbols, the symbol period being $T_{SS}$, and for modulating the selected frequency signals to produce $n$-ary phase shift modulated signals, where the frequency spacings $\Delta f$ between adjacent $n$-ary phase shift modulated signals are equal, and $$\frac{1}{\Delta f} \leq T_{SS}.$$

* * * * *